No. 767,865. PATENTED AUG. 16, 1904.
A. E. BROWN.
BRAKE FOR OVERHEAD ELECTRICALLY DRIVEN LOCOMOTIVES.
APPLICATION FILED APR. 20, 1904.
NO MODEL. 2 SHEETS—SHEET 1.

WITNESSES: INVENTOR
Alexander Ephraim Brown
BY George C. Wing
ATTORNEY.

No. 767,865. PATENTED AUG. 16, 1904.
A. E. BROWN.
BRAKE FOR OVERHEAD ELECTRICALLY DRIVEN LOCOMOTIVES.
APPLICATION FILED APR. 20, 1904.
NO MODEL. 2 SHEETS—SHEET 2.
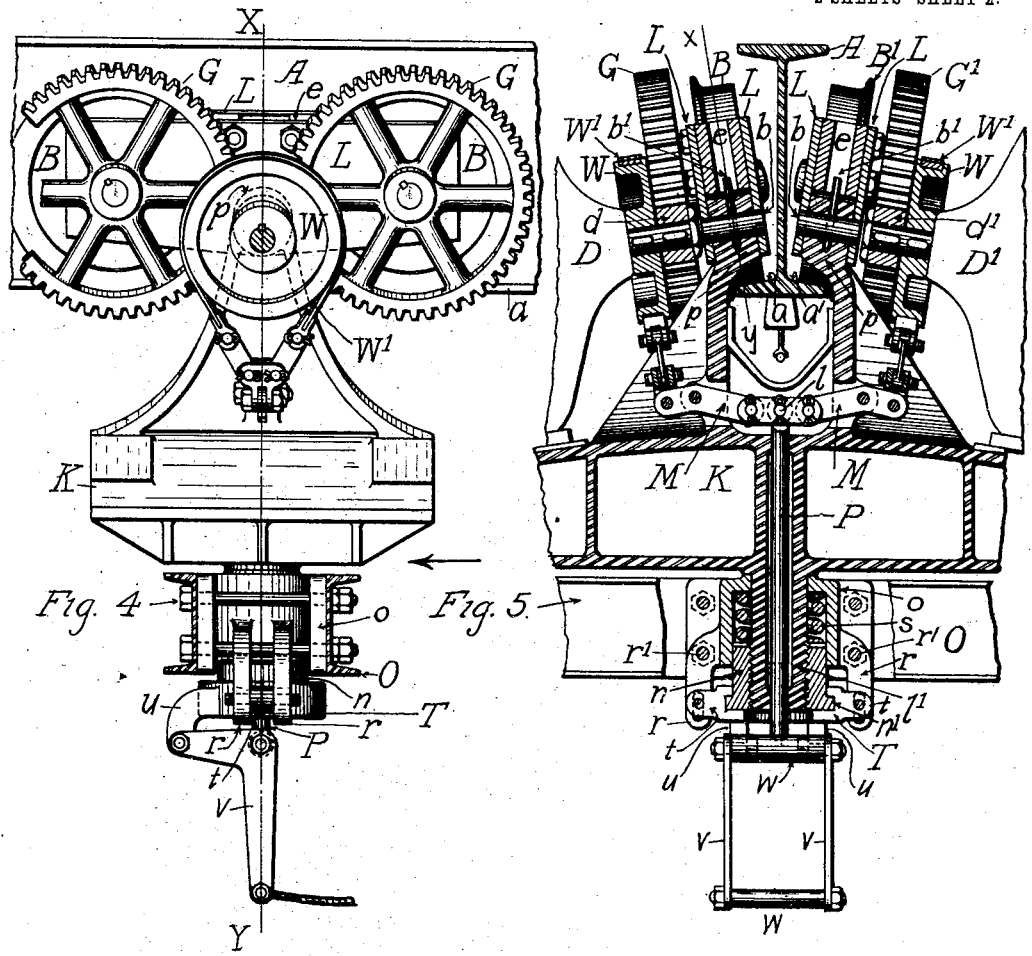

No. 767,865.   Patented August 16, 1904.

UNITED STATES PATENT OFFICE.

ALEXANDER EPHRAIM BROWN, OF CLEVELAND, OHIO, ASSIGNOR TO THE BROWN HOISTING MACHINERY COMPANY, OF CLEVELAND, OHIO, AN INCORPORATED COMPANY.

BRAKE FOR OVERHEAD ELECTRICALLY-DRIVEN LOCOMOTIVES.

SPECIFICATION forming part of Letters Patent No. 767,865, dated August 16, 1904.

Application filed April 20, 1904. Serial No. 203,997. (No model.)

*To all whom it may concern:*

Be it known that I, ALEXANDER EPHRAIM BROWN, a citizen of the United States, residing at Cleveland, Ohio, have invented a certain new and useful Improvement in Brakes for Overhead Electrically-Driven Locomotives; as to which I hereby declare the following is a full, clear, and exact description, due reference being had and intended to the several drawings accompanying this specification and which I mean shall be considered as a part of the same.

My invention is concerned more particularly with the class of locomotives above referred to which are suspended from an I-beam by a series of two or more sets or pairs of wheels, the opposite members of which pairs are severally mounted and travel upon opposite flanges of such I-beam and which, furthermore, are respectively driven by a motor specially provided for driving the same.

The main purpose and object of my invention is to provide a braking apparatus for locomotives of the above class that can be operated from the cage or platform beneath and carried by the same with equal efficiency when traveling upon either a straight or curved track and which will, moreover, permit the brakes to be worked on all the wheels at once and to the same degree.

I accomplish the above purpose and object by the mechanical arrangement I shall now proceed to describe, having reference to said drawings, wherein in each case similar parts are described by similar letters.

Figure 1:
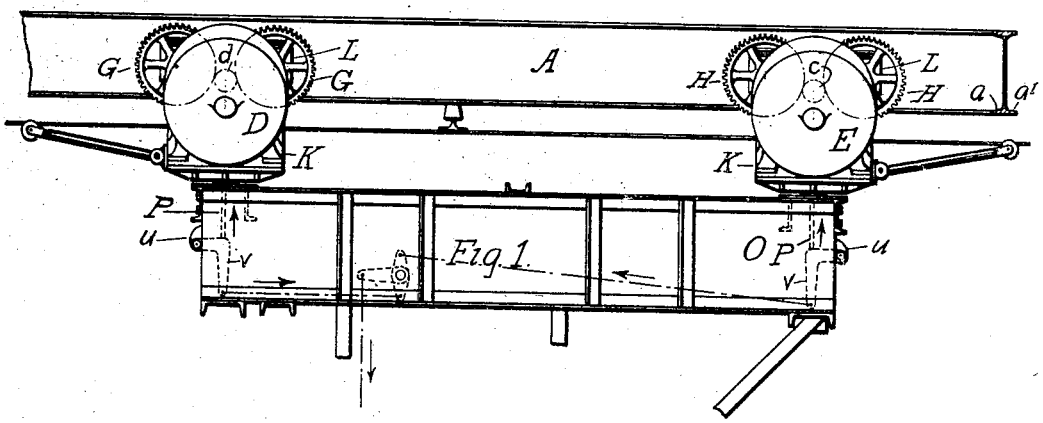
Figure 2:
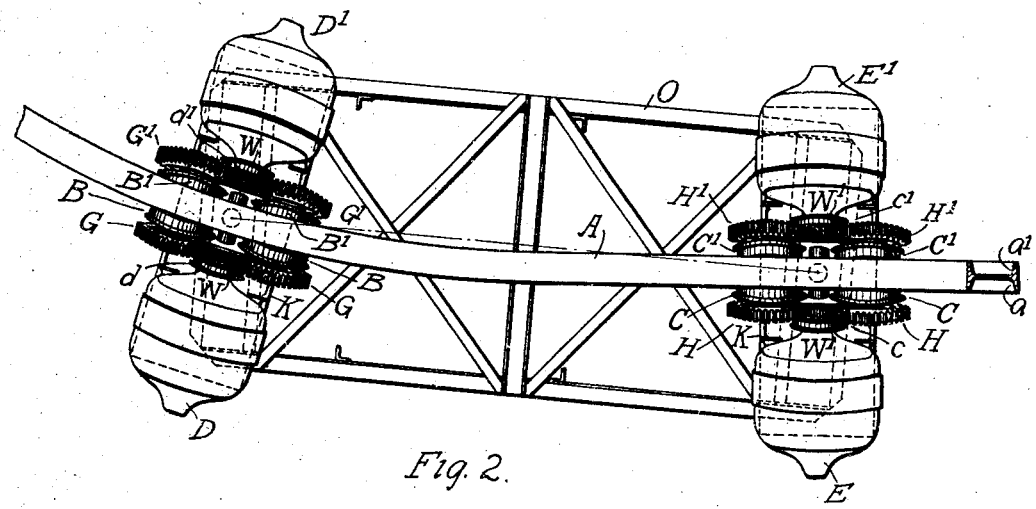
Figure 3:
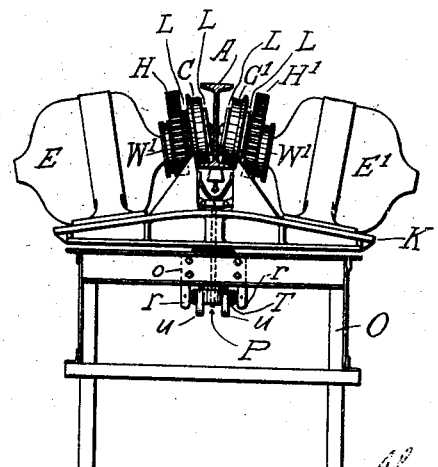

In said drawings, Figure 1 is a side view of a double-truck type of locomotive to which my said braking device is applied and the upper portion of its pendent cage or platform. Fig. 2 is a downward plan view of the type of locomotive shown in Fig. 1 with suitable motors, gearing, and brake-wheels for the same. Fig. 3 is a front view of either pair of driving-wheels that make up the trucks in Fig. 2 and their accompanying driving apparatus. Fig. 4 is a side view of my braking mechanism with the motor removed when applied to the form of track-wheel arrangements shown in Fig. 2. Fig. 5 is a vertical sectional view through the line X Y of Fig. 4 looking in the direction of the arrow, and Fig. 6 is an oblique sectional view toward the gear and pinion wheels through the line $x\,y$ in Fig. 5.

A is a suspended I-beam whose flanges $a\,a'$ constitute an overhead track for any desired distance upon which the locomotive is to travel and be operated.

B B' and C C' are the supporting or driving wheels, constituting together two four-wheel trucks upon and by means of which the travel is made.

D D' and E E' are truck-motors whose shafts are prolonged to serve as the shafts of pinions $d$, $d'$, $c$, and $c'$, that respectively mesh with the gear-wheels G G' and H H', located on opposite sides of the same.

K is a casting that carries said gear-wheels, the driving-wheels B B' C C', the truck-motors D D' E E', centrally located with respect to the same, and the several other operative parts and adjuncts of the brake device proper.

The casting K extends laterally from and beneath the flanges $a$ and $a'$ of the track or I-beam A to a sufficient degree to receive and permit said truck-motors to be mounted in their proper place upon the same. The casting K projects upwardly on each side of said I-beam in protuberant portions or sections, (indicated in the drawings Figs. 3, 5, 6 by $p\,p$.) These sections $p\,p$ of the casting K together branch around and under the flanges $a\,a'$ of the track-rail or I-beam A and respectively project upwardly between the gear-wheels G G' and H H'. They have a thickness as respects the width or thickness of the wheels B B' C C' that slightly exceeds the width or thickness of the latter and of course accommodate themselves to the oblique alinement of the tracks to which they severally relate.

At the outer side of the protuberant parts $p\,p$ of the casting K are plates L L, which plates are fastened together by bolts that pass through the same and through the separating-blocks $e\,e$, located centrally upon their inner faces. The plates thus secured together are in this manner made to span, respectively, the protuberant parts $p$ $p$ and are secured thereto accordingly near their lower edges by a bolt or pin $b$, that passes at a loose fit through holes in the plates provided for the purpose and through the part $p$ in each case. Said bolt $b$ is itself secured in place by the drop-pin $b'$, that penetrates both the part $p$ and the bolt $b$.

Holes are provided at each end of the plates L, as indicated, of suitable dimensions to receive the shafts or spindles $g$ of the driving-wheels B B' C C' and permit the same to rotate therein. Said wheels are attached accordingly in pairs to the extremities of the equalizing frame or body made up of the plates L L, connected together and to the casting K in the manner just described by their shafts or axles $g$, which shafts or axles are prolonged on the outer side of the wheels to a proper distance to serve as shafts for the several gear-wheels G G' H H'. Said gear-wheels are mounted upon the projecting ends of the shafts $g$ and in such position are keyed or otherwise secured against rotary or other movement thereon.

Firmly mounted upon the shafts of the motors D D' E E' between the motors and their pinions $d$ $d'$ $e$ $e'$ are brake-wheels W W, each provided with brake bands or loops W' W', whose ends meet below their wheels and are there pivotally connected to the shorter arm of levers M M. Said levers M M are fulcrumed to the casting K at a suitable point below and on the inner side of the brake-wheels W. Their longer arms project inwardly toward a point directly below the center of the track or I-beam A, where they are connected one with the other by a slotted T or cross-head or in other manner that allows them to be oscillated vertically. At the junction-point of said levers immediately below the center of the I-beam A is hung a rod or plunger-like part P by means of a pin (shown at $l$ in the drawings) that passes through eyes in said cross-head and joins the two levers M and the upper end of said plunger-rod P. Said plunger-rod P when thus hung is of sufficient length to extend downwardly through and below the casting K. In order to accommodate and guide the plunger-rod P in the vertical oscillations to which it is to be subjected, the casting K is prolonged downwardly in a tube-like projection, (designated by $l'$.) Said projection in the special form for using my invention illustrated by the drawings is threaded at its lower end, so as to receive a sleeve or collar $n$, provided with a flange $n'$. Above the sleeve $n$ is located a spiral spring $s$, and from and upon this spring depends an operating-cage O, in which are contained and carried the necessary hoisting-motors and the controllers and rheostats for both the hoisting and the truck motors. As will be plain on referring to the drawings, the operating-cage O, by means of the inwardly-flanged and upwardly-projecting part $o$, that rests directly upon the spiral springs and indirectly upon the sleeve or collar $n$, is swively connected with and supported by the casting K, and either the forward or rear truck, to which said cage is appendant, is accordingly free to move horizontally with respect to the same. The spring $s$ at the same time permits a certain degree of vertical oscillation between the cage O and the casting K and its appurtenances, and the effect on the machinery of jars and shocks due to unevenness or irregularities in the track is thereby largely reduced.

On opposite sides of the cylindrical part $o$ are located a pair of dependent lugs $r$ $r$, through which bolts $r'$ $r'$ securely unite said parts with the cage O. At their lower ends are upright slots, whereby and by means of corresponding slots in ears $t$ $t$, projecting therefrom, the halves of a divided collar T, that together encircle the sleeve $n$ around its rim $n'$, are connected to said lugs $r$ $r$ at a sliding fit. Depending from said collar T are two outwardly-projecting lugs $u$ $u$, to which are pivotally connected at their lower ends one arm of an angle $v$. Such arm is of a length equal to the distance between its said point of connection with the lugs $u$ $u$ and a point beneath the center of the I-beam A. Each pair of angles $v$ $v$ are connected by cross-pieces $w$ $w$ between their angles and by similar cross-pieces between their lower arms, the uppermost cross-piece $w$ being so located that when the pair of angles just described are drawn forward on their pivot through the lugs $u$ $u$ such cross-pieces will be brought into bearing below and against the plunger-rod P. The lower cross-piece of each of said pairs of angles is utilized as a point of attachment of a rope or other actuating medium of the same. In Fig. 4 a rope for this operating purpose is indicated.

I wish it to be understood that in showing and describing a special form of overhead locomotive I by no means intend to limit my brake invention accordingly. The detailed description I have given is intended only as illustrating one specific form of mechanism to which that invention may be usefully applied and not as pointing out essential conditions for its use. It will be observed that the braking apparatus I show is equally serviceable in overhead locomotives carrying an operator and an operating house or cage whether the latter is elastically connected or hung from the locomotive proper, as I have shown, or whether such connection is rigid so far as vertical movement is concerned, and in this particular my device, as compared with others of the kind, is exceptional, the advantage of elastically hanging the cage, and thereby relieving the machinery from jar, being gained by its use. This characterization is founded, of course, on the fact that in the method of construction employed the brakes are applied by upward pressure against the levers M through the pivotal or swiveling point of truck and cage and the connections between the brake-levers M and brake-actuating parts below are by contact only and separable, A further and chief merit of the invention is the ability it furnishes the operator to apply brakes simultaneously and with equal force upon each driving-wheel of the system, and this is accomplished, unlike other form of brake apparatus, whether the trucks are on a curve or are on a straight track. This advantage is of course due to the fact that the pendent operating-house is pivoted and that the plunger-rod P, actuating the brake-levers M, is centrally located in line with and beneath such pivot-point and is free to turn upon the cross-piece or bearing $w$. Any variation, therefore, from the normal relation of cage and truck, whether horizontally, as in rounding a curve, or vertically, as when track irregularities are encountered, will not affect the plunger-rod P or brake a forward truck, for instance, to a different degree than a rear.

Having thus described my said invention, what I claim, and desire to secure by Letters Patent, is—

1. In combination with an overhead truck, or trucks provided with a downwardly-extending hollow part or member, centrally located with respect thereto, of suitable braking apparatus mounted on said truck, or trucks, having brake-actuating levers that reach inwardly above said part, or member, and are there pivotally connected with a rod or plunger-like piece that hangs freely within and through said part or member, an operating house or cage swivelly suspended from said part or member, and suitable means for actuating said rod or plunger-like piece vertically, substantially as shown and described.

2. In combination with an overhead electrically-driven truck, or trucks, provided with a downwardly-extending hollow part, or member, centrally located with respect thereto, of suitable braking apparatus, mounted on said truck, or trucks, having brake-actuating levers that reach inwardly above said part, or member, and are there pivotally connected with a rod, or plunger-like piece that hangs freely within and through said part, or member, an operating house, or cage, swivelly suspended from said part or member, and suitable means for actuating said rod, or plunger-like piece, vertically, substantially as shown and described.

3. In combination with an overhead electrically-driven truck, or trucks, provided with a downwardly-extending hollow part or member, centrally located with respect thereto, of suitable braking apparatus, mounted on said truck, or trucks, having brake-actuating levers that reach inwardly above said part, or member, and are there pivotally connected with a rod or plunger-like piece that hangs freely within and through said part, or member, an operating house or cage elastically suspended from said part or member in a manner to permit said cage or house to rotate or swivel about or around said part or member, and suitable means of oscillating said rod or plunger-like piece, in order to thereby actuate said brake-actuating levers and brake apparatus, substantially as shown and described.

Cleveland, Ohio, March 8, 1904.

ALEXANDER EPHRAIM BROWN.

In presence of—
HOWARD A. COUSE,
GEORGE C. WING.